United States Patent [19]
Kimoto et al.

[11] Patent Number: 5,350,288
[45] Date of Patent: Sep. 27, 1994

[54] INJECTION MOLDING UNIT

[75] Inventors: Hidetoshi Kimoto, Moriguchi; Isao Shihota, Settsu, both of Japan

[73] Assignees: Daiho Industrial Co., Ltd.; Dainichi Mold Manufacturing Co., Ltd., both of Osaka, Japan

[21] Appl. No.: 139,026

[22] Filed: Oct. 21, 1993

[30] Foreign Application Priority Data

Oct. 22, 1992 [JP] Japan .................. 4-284236

[51] Int. Cl.⁵ .......... B29C 45/18; B29C 45/20; B29C 45/76
[52] U.S. Cl. .................. 425/136; 425/145; 425/146; 425/149; 425/151; 425/546; 425/567; 425/577
[58] Field of Search .......... 425/149, 577, 192 R, 425/136, 145, 146, 151, 546, 568, 569

[56] References Cited

U.S. PATENT DOCUMENTS

| | | |
|---|---|---|
| 3,443,628 | 5/1969 | Carr .................. 425/149 |
| 3,969,055 | 7/1976 | Buckethal .................. 425/149 |
| 4,161,380 | 7/1979 | Bishop .................. 425/145 |
| 4,411,609 | 10/1983 | Yoshii et al. .................. 425/149 |
| 4,632,652 | 12/1986 | Farrel .................. 425/149 |
| 4,863,651 | 9/1989 | Koten .................. 425/149 |
| 5,194,195 | 3/1993 | Okushima .................. 425/149 |

FOREIGN PATENT DOCUMENTS 5-138682 6/1993 Japan .

*Primary Examiner*—Khanh Nguyen
*Attorney, Agent, or Firm*—Wenderoth, Lind & Ponack

[57] ABSTRACT

An injection molding unit has an injection molding machine 1 for injecting a molten resin plasticized in a screw cylinder 4 from a nozzle 9 fitted at the tip of the screw cylinder 4 by advancing a screw 3. An injection mold 31 forms a hollow 36 for forming an injection molded product 35 with a cavity mold 33 and a core mold 34. The injection molding unit further has a pressure relief valve 40 for releasing the resin out of a resin passage when a pressure greater than a predetermined value acts at any point on the resin passage, including the screw cylinder and ranging up to the terminal end of the hollow. The cavity mold 33 is of a split construction, in which a wall portion of the hollow is formed a plurality of segments.

18 Claims, 12 Drawing Sheets

INJECTION MOLDING UNIT

BACKGROUND OF THE INVENTION

1. Field of the Invention

The present invention relates to an injection molding unit having a safety device for prevention of overpressure.

2. Description of the Prior Art

Conventionally, there is known an injection molding unit as shown in FIG. 19, which comprises an injection molding machine 1 and an injection mold 2. The injection molding machine 1 is provided with a screw cylinder 4 having a screw 3 accommodated therein, a heater 5 for heating resin within the screw cylinder 4, a hopper 7 for feeding powder resin 6 into the screw cylinder 4, a hydraulic device 8 for moving the screw 3 forward and backward, and an unshown rotation driving unit for rotating the screw 3 forwardly and reversely. A nozzle 9 is formed at the tip of the screw cylinder 4. The hydraulic device 8 has a hydraulic cylinder 10, and a piston rod 12 integrally coupled with a piston 11 of the hydraulic cylinder 10 serves as the shaft of the screw 3.

To the hydraulic cylinder 10 are connected oil passages 16, 17 provided with selector valves 13, 14, and a throttling valve 15 in such a way that the oil passages 16, 17 communicate with spaces to the front and rear of the piston 11. The oil passage 16 leads to an oil reservoir 18, while the oil passage 17 is connected with an oil pump 19. Another oil passage 20 is also provided between the selector valves 13 and 14. With this arrangement, pressure oil is fed from the oil pump 19 to the rear of the piston 11 and discharged from the front of the piston 11 to the oil reservoir 18, and vice versa, by appropriately actuating the selector valves 13, 14, whereby the screw 3 can be moving forward and backward along with the piston 11.

The injection mold 2 is composed of a cavity mold 21 and a core mold 22, between which is formed a hollow 24 for molding of an injection molded product 23 (in the drawing, reference number "24" is parenthesized beside "23" because it appears therein, overlap with the injection molded product 23). Within the wall portion forming this hollow 24, an unshown cooling water passage is formed. Further, the cavity mold 21 is provided with a resin injection port 27 which communicates with the hollow 24 via a sprue 25 and a runner 26. The nozzle 9 is to be urged against the resin injection port 27.

The injection molding machine 1 and the injection mold 2 are arranged so as to be movable in the axial direction of the screw 3 relative to each other by a mechanism which is not shown.

In this arrangement, the powder resin 6 fed from the hopper 7 into the screw cylinder 4 is transferred toward the nozzle 9 by rotation of the screw 3 and moved to an intermediate point within the screw cylinder 4 and heated by the heater 5, thereby being plasticized into a molten resin state.

In the injection molding process, the injection molding machine 1 and the injection mold 2 are moved relative to each other so that the nozzle 9 is urged into contact with the resin injection port 27 of the injection mold 2 that has been closed, and then pressure oil is fed to the rear of the piston 11 to expand the hydraulic cylinder 10, thereby moving the screw 3 deep into the screw cylinder 4, or toward the nozzle 9. As a result, the molten resin that has accumulated at the tip of the screw 3 is injected from the nozzle 9 to the hollow 24 sequentially through the resin injection port 27, the sprue 25, and the runner 26, and is thus filled into the hollow 24.

The molten resin filled in to the hollow 24 as described above is cooled by the injection mold 2 so as to solidify upon the lapse of a predetermined period. In order to shorten the cooling period, the resin in the hollow 24 is adapted to be cooled by the aforementioned cooling water passage formed in the injection mold 2.

Also, in order to fill the molten resin from the nozzle 9 into the hollow 24 via the sprue 25 and the runner 26, the resin that has accumulated at the tip of the screw 3 needs to be pressurized and injected toward the hollow 24. This pressure to be applied to the resin is referred to as injection pressure. Although normally the injection pressure, if referred to as it is, often means a hydraulic pressure introduced to the hydraulic cylinder 10, this hydraulic pressure is represented herein by an injection hydraulic pressure $P_{OI}$ for the sake of avoiding confusion. What is important is the pressure that acts on the resin, and this pressure changes according to the location of the resin. Thus, a resin pressure at the tip of the screw 3 is represented as $P_{SC}$, that at the entrance of the injection mold 2 is $P_{C1}$ and that at the terminal end of the hollow 24 is $P_{C2}$.

In the conventional injection molding, the injection hydraulic pressure $P_{OI}$ is normally 80–140 at, whereas the effective area of the piston 11 is about ten times that of the screw 3, so that the resin pressure $P_{SC}$ at the time of injection is 800–1400 at. The resin pressures $P_{C1}$ and $P_{C2}$ at that time, although variable in the state of pressure transfer from the tip of the screw 3 into the injection mold 2, depending on the configuration of the hollow 24, can be estimated to be 400–500 at.

The wall surface of the hollow 24 of the injection mold 2 is subject to a load represented by the product of the area of the pressured portion of the wall surface and the resin pressure. For example, if the injection molded product is a TV cabinet with a 60 cm×20 cm top surface, on the condition that values of the resin pressures $P_{C1}$ and $P_{C2}$ are each 400 at., the load that acts on the overall wall surface that forms the top surface of the hollow 24 is as much as 480 t.

On this account, the injection mold 2 is required to have a strength such as to withstand this load, which would result in a great mold thickness. In particular, the cavity mold 21, since it receives internal pressure in a direction such that it spreads outward, is generally manufactured by carving the inside of a steel ingot to obtain enough strength to withstand the internal pressure. As a result, the injection mold 2 would be expensive and take a long time to manufacture. Therefore, if excessive pressure acts on the resin, for example due to a malfunction of the hydraulic device or erroneous operation of the machine, such that the injection mold 2 is damaged, which is exemplified by a crack 28 occurring on the cavity mold 21 as shown in FIG. 20, then not only a great amount of expense will be involved in manufacturing a new injection mold 2, but the injection molding work will also be interrupted for a long time period, resulting in a great economic loss.

To avoid to occurrence of such a situation, it has conventionally been the case that the injection molding unit is provided with a safety device which measures the resin pressure in the injection molding process by an electrical method, and works so as to automatically stop the machine if the measured pressure exceeds a predetermined value, thereby preventing any damage to the injection mold due to excessive pressure.

In the above-described conventional injection molding unit, the safety device used to prevent the injection mold from damage due to excessive pressure is adapted to measure the pressure electrically and indirectly, and thus is not satisfactory in reliability. In other words, when a malfunction arises in the electrical circuit of the safety device, or when electricity is not properly conducted to the electrical circuit, the safety device will not operate, and is one problem.

Also, in the safety device employing an electrical circuit as described above, when the sensor has detected an abnormal pressure, there will be a time lag after the abnormal pressure has already been applied to the injection mold until the pressurization is actually stopped. This accounts for another problem, in that the safety device is insufficient from the viewpoint of preventing breakage of the injection mold.

SUMMARY OF THE INVENTION

The present invention has been accomplished with a view toward solving these and other problems of the prior art, and its primary object is to provide an injection molding unit which can prevent any excessive abnormal resin pressure from being applied to the injection mold with high reliability, and which can facilitate the manufacture of the injection mold.

To achieve the above object, the present invention, as its first aspect, provides an injection molding unit having an injection molding machine for injecting a molten resin plasticized in a screw cylinder from a nozzle fitted at the tip of the screw cylinder by advancing a screw. A metal mold forms a hollow part for forming an injection molded product with a cavity mold and a core mold. The injection molding unit further comprises pressure relief means for releasing the resin out of a resin passage when a pressure greater than a predetermined value is received at any point on the resin passage, including the screw cylinder and ranging up to the hollow part. The cavity mold is of a split construction in which a wall portion of the hollow is formed from a plurality of segments.

Still further, the present invention, as its second aspect, provides an injection molding unit according to the first aspect wherein the pressure relief means is provided at a position on an upstream side, including the runner portion of the resin passage.

With the arrangement according to the first aspect of the invention, the pressure relief means directly receives pressure so that the resin will be released out of the passage if the pressure rises above a predetermined value.

Further, the injection mold can be manufactured separately for each of the plurality of segments that constitute the injection mold.

Still further, with the arrangement according to the second aspect of the invention, besides the function of the first aspect, the pressure relief valve receives pressure on a relatively high pressure side within the resin passage.

DETAILED DESCRIPTION OF THE PREFERRED EMBODIMENTS

An embodiment of the present invention is now described with reference to the accompanying drawings.

Figure 19:
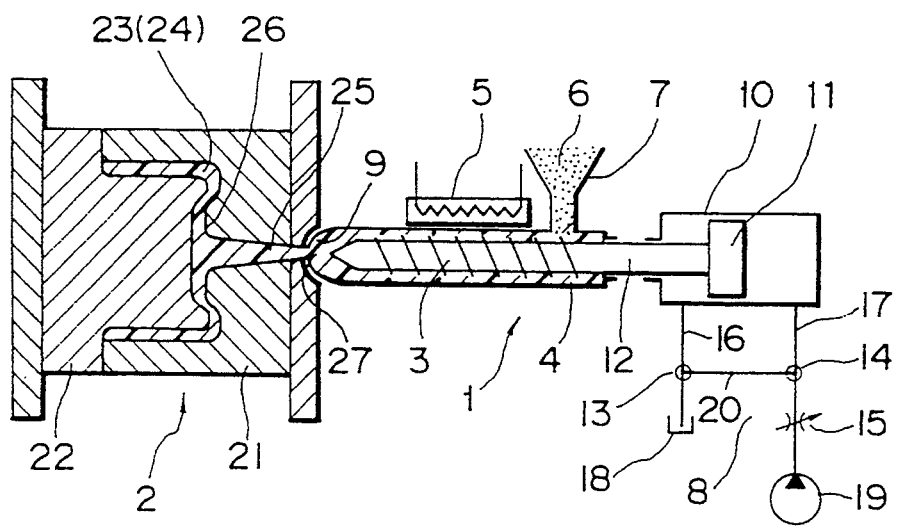
FIG. 19 is a view schematically showing a conventional injection molding unit.
Figure 20:
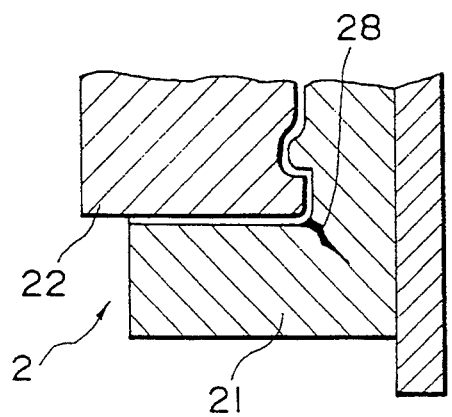
FIG. 20 is a partially enlarged sectional view showing an example of a damaged state of the injection mold as shown in FIG. 19.

FIGS. 1 to 7 show an injection mold 31 of an injection molding unit according to a first embodiment of the first and second aspects of the present invention. The injection mold 31 constitutes an injection molding unit in combination with an injection molding machine 1, for example, as shown in FIG. 19. Hereinbelow described is the injection molding unit composed of the injection mold 31 and this injection molding machine 1.

Figure 8:
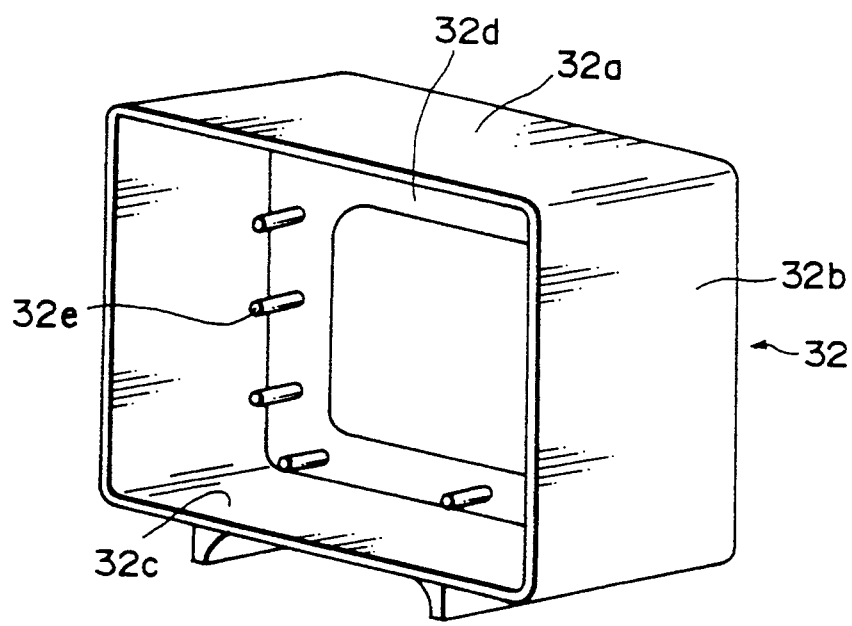
FIG. 8 is a perspective view of a TV cabinet, which is a resin molded product of the injection mold as shown in FIG. 1.

In this embodiment, the injection mold 31 is designed to mold a TV cabinet 32 as shown in FIG. 8 as an example. Referring to FIG. 8, a top plate is designated by reference numeral 32a; a side wall, 32b; a bottom plate, 32c; a front panel, 32d; and a boss, 32e.

The injection mold 31 comprises a cavity mold 33 and a core mold 34, between which there is formed a hollow 36 (shown as parenthesized beside "35" as before) for molding the resin 35 into a shape of the TV cabinet 32. The cavity mold 33 and the core mold 34 are held by retainers 37, 38, respectively, and secured to holders as indicated by two-dotted chain line in FIG. 1. At least one of the retainers 37, 38, the retainer 38 in the present embodiment, is arranged to be movable in a direction as toward or away from the retainer 37.

Figure 3:
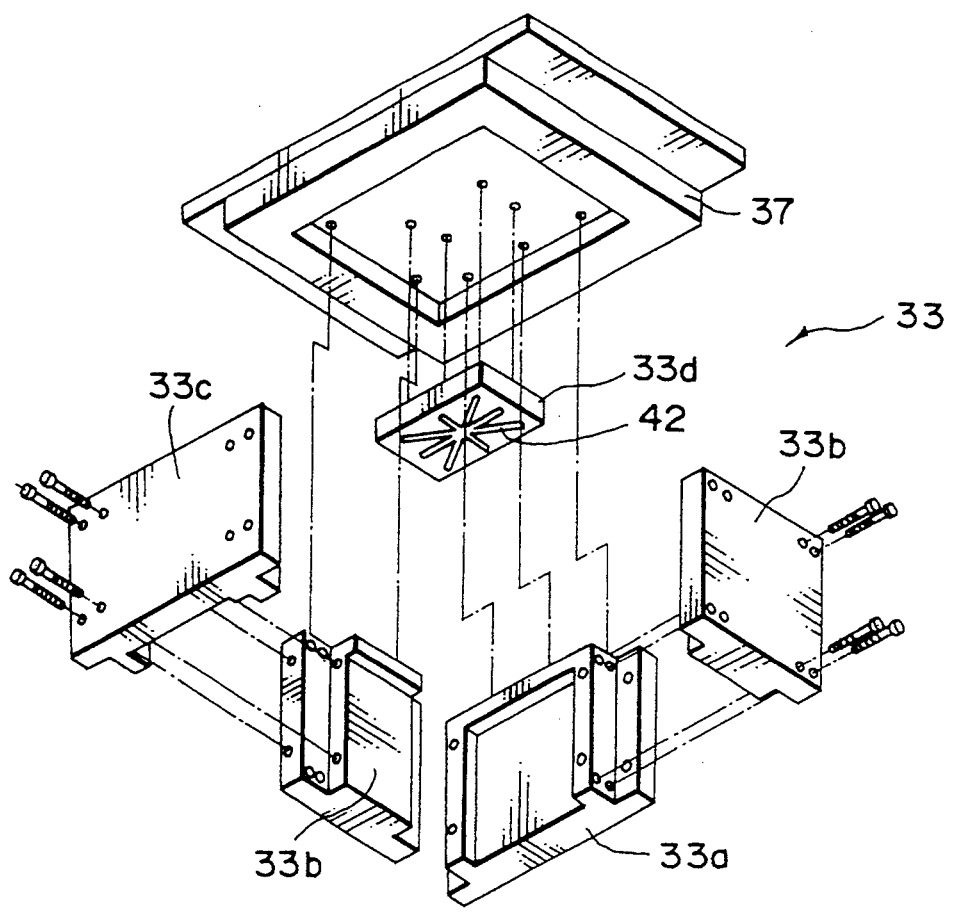
FIG. 3 is an exploded perspective view of a cavity mold of the injection mold as shown in FIG. 1 and a fitting portion.
Figure 4:
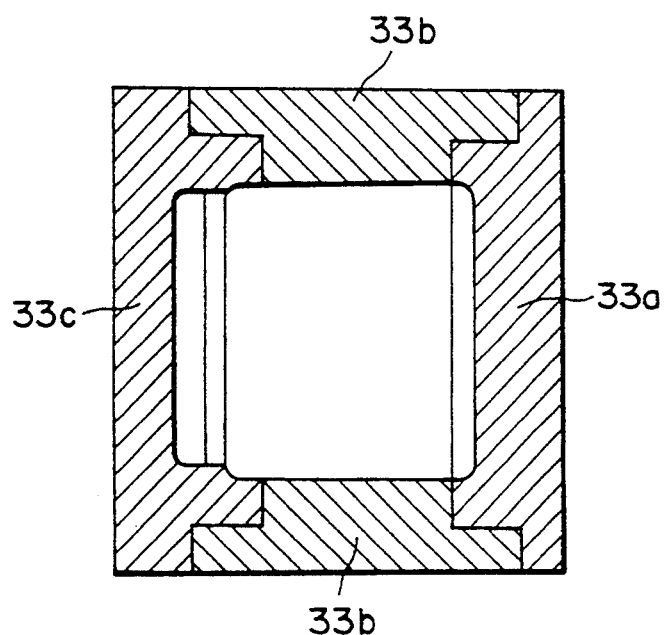
FIG. 4 is a sectional view of the cavity mold taken along line IV—IV of FIG. 1.
Figure 5:
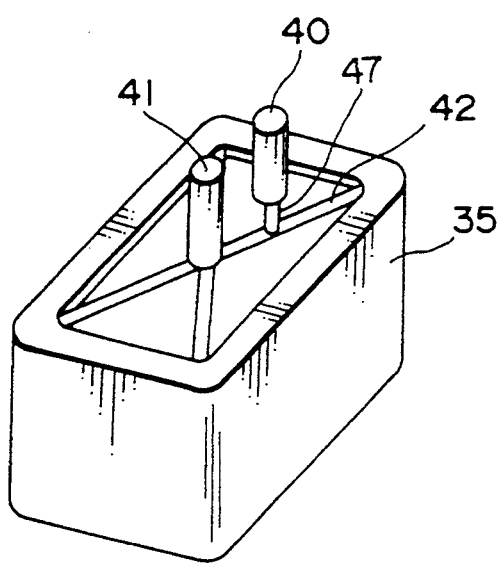
FIG. 5 is a perspective view schematically showing a resin passage of the injection mold as shown in FIG. 1.

The cavity mold 33, as shown in FIG. 3, is of a split construction in which a wall portion forming the hollow 36 is composed of a plurality of segments, for example a top plate 33a, a side wall 33b, a side core support 33c, and a front panel 33d. These segments have stepped portions at their ends, the stepped portions being assembled and bolted to one another to form the cavity mold 33.

Also, a sprue 39 and a pressure relief valve 40 are provided so as to penetrate through the cavity mold 33 and the retainer 37. A nozzle 9 of the injection molding machine 1 is urged into contact against a resin injection port 41, which is a spherical concave portion formed at an opening of a side of the sprue 39 on the retainer 37 at the time of injection molding. Another opening of the sprue 39 on the side opposite to the retainer 37 communicates with the hollow 36 via a runner 42.

There is further provided a resin passage which leads to the terminal end of the cavity mold 33 from a screw cylinder 4 via the nozzle 9, the resin injection port 41, the sprue 39, and the runner 42.

Figure 6:
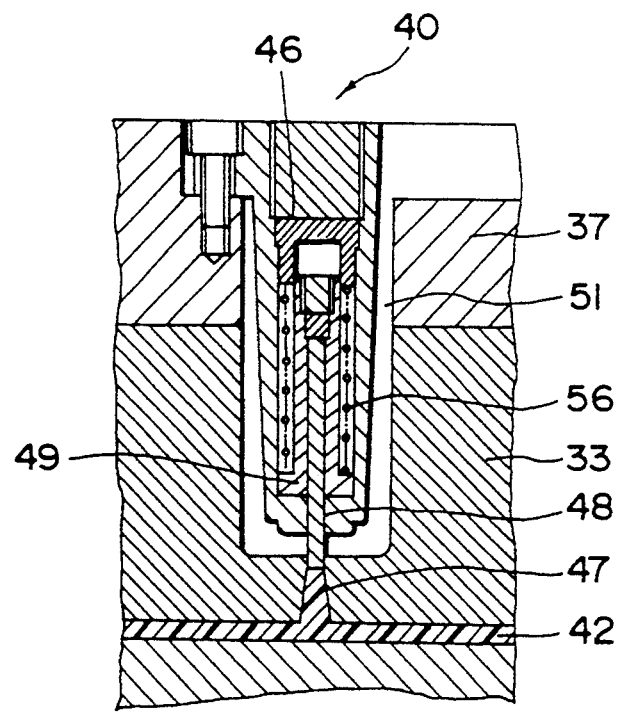
FIG. 6 is an enlarged sectional view showing the state of a pressure relief valve of the injection mold as shown in FIG. 1, and its fitting portion, under normal resin pressure.
Figure 7:
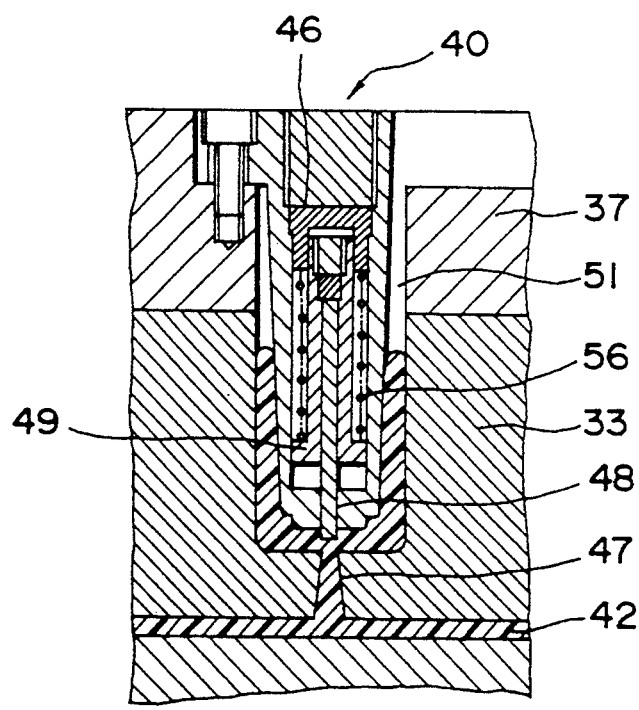
FIG. 7 is an enlarged sectional view showing the state of a pressure relief valve of the injection mold as shown in FIG. 1, and its fitting portion, under abnormal resin pressure.

The pressure relief valve 40, as detailed in FIGS. 6 and 7, is provided with a first pusher 46, a small hole 47, a valve body 48, a second pusher 49, and a coil spring 50.

The first pusher 46 has a bottomed hole open downward in FIGS. 6 and 7, and is located within a space open to the outside of the retainer 37 and secured by the retainer 37, thus forming a resin release passage 51.

The small hole 47 allows the resin release passage 51 and the runner 42 to communicate with each other, and the valve body 48 can be slidably fitted into the small hole 47.

The second pusher 49 is slidably fitted into the aforementioned bottom hole at its one end, has a bottom hole open downward in FIGS. 6 and 7, and has the valve body 48 fitted into the bottom hole.

The coil spring 50 intervenes between the first pusher 46 and the second pusher 49, urging the valve body 48 toward the runner 42 via the second pusher 49 at all times.

When the resin pressure in the runner 42 is below a predetermined value, the force exerted by the coil spring 50 is larger than the resin pressure and maintains a state with the valve body 48 fitted into the small hole 47, wherein the small hole 47 is closed, as shown in FIG. 6.

In contrast, when the resin pressure is greater than the predetermined value, the resin pressure surpasses the force exerted by the coil spring 50 to push the valve body 48 upward and out of the small hole 47 so that the small hole 47 communicates with the resin release passage 51, as shown in FIG. 7. As a result, the resin in the runner 42 is discharged out of the cavity mold 33 via the resin release passage 51, whereby the resin pressure in the runner 42, and therefore the resin pressure in the hollow 36, can be prevented from abnormally increasing. Thus, the injection mold 31 can be prevented from breakage due to abnormal increases in the resin pressure.

Further, within the cavity mold 33 there is provided a coolant passage 52 for cooling the wall portion of the hollow 36.

Figure 1:
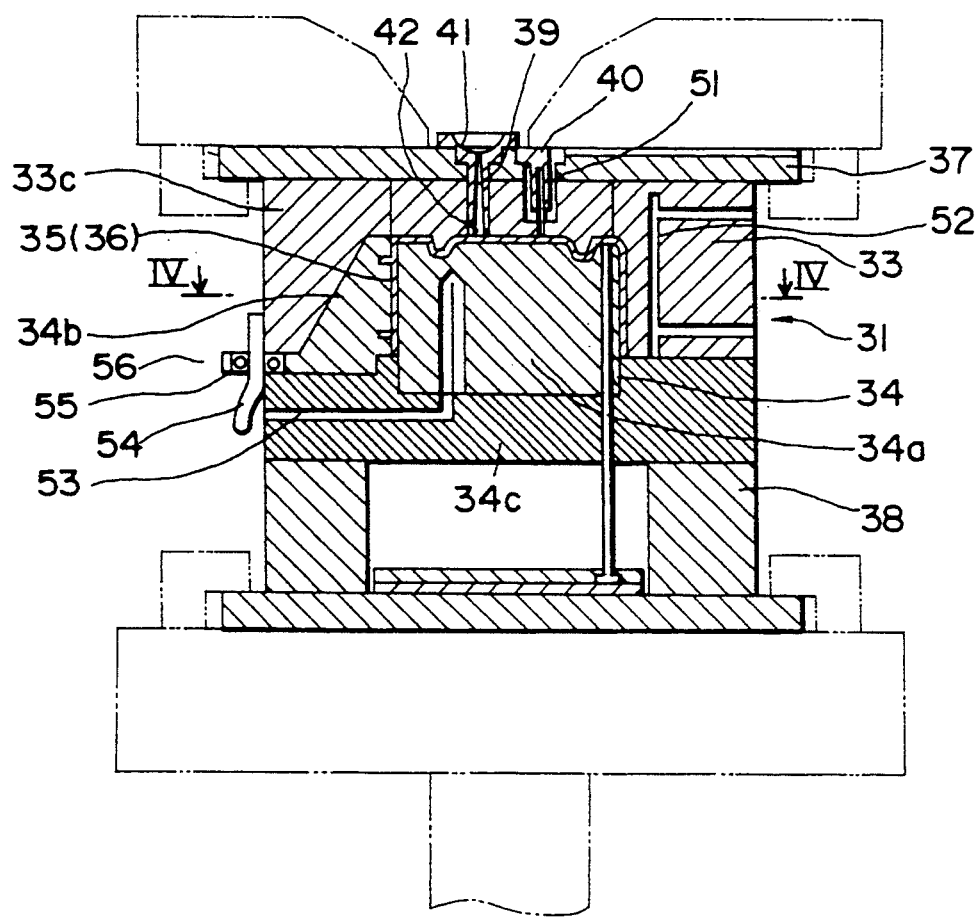
FIG. 1 is a sectional view of an injection mold of an injection molding unit according to a first embodiment of first and second aspects of the present invention in a closed state.
Figure 2:
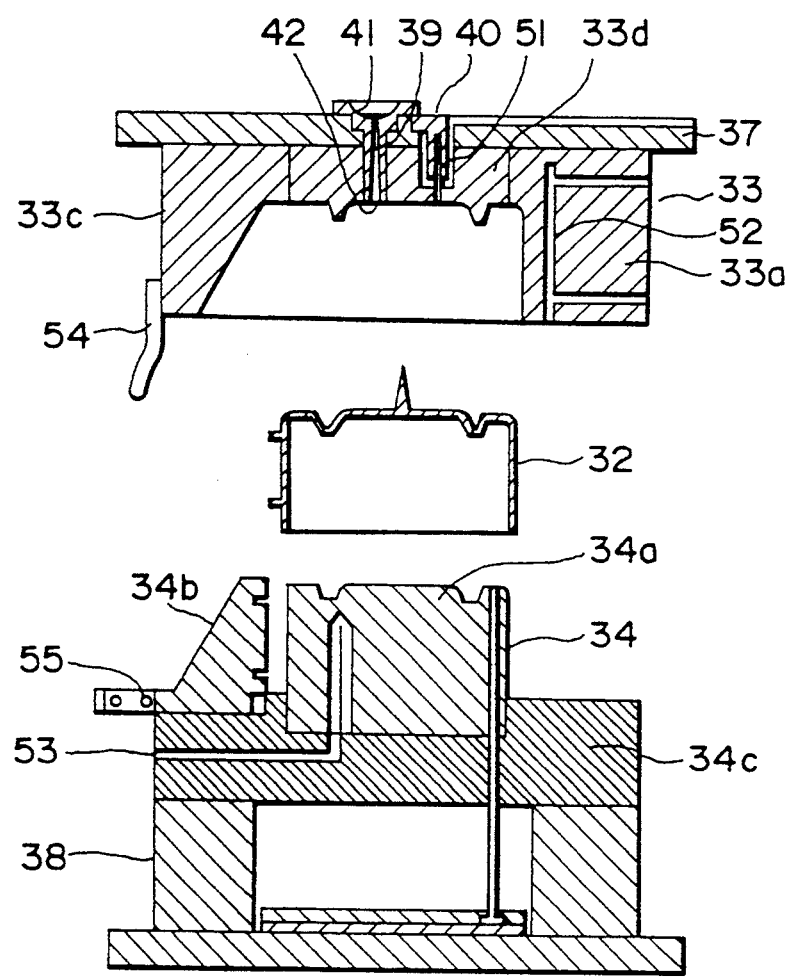
FIG. 2 is a sectional view of the injection mold as shown in FIG. 1 in an opened state after injection molding.

The core mold 34 in this embodiment is of the conventionally used construction, comprising a core body 34a, a side core 34b, and a core bottom plate 34c, the core bottom plate 34c being fixed on the retainer 38. Also, a coolant passage 53 for cooling the wall portion of the hollow 36 is formed so as to penetrate through the core bottom plate 34c and lead to the inside of the core body 34a. Meanwhile, there is provided a clamping means 56 comprising a cam member 54 secured to a side portion of the cavity mold 33, and two rotatable rollers 55, having their axes in a direction perpendicular to the plane of the figure, at side portions of the side core 34b. When injection molding, the side core 34b is locked to the cavity mold 33 via the clamping means 56 as shown in FIG. 1, and fixed in position on the core bottom plate 34c. Further, when mold-releasing the TV cabinet 32, which is an injection molded product, as shown in FIG. 2, the cavity mold 33 is separated from the core mold 34. The cam member 54 moves upward in the figure so that the side core 34b can be moved along with the rollers 55 in such a direction as to be separated and moved away from the core body 34a.

The injection mold 31 constructed as described above is used at the time of injection molding in a state where it is closed as shown in FIG. 1 and rotated 90° to be laid down. More concretely, while the nozzle 9 of the injection molding machine 1 as shown in FIG. 19 is urged against the resin injection port 41, and while the screw 3 is being advanced, the molten resin is fluidly fed under pressure to the hollow 36 via the nozzle 9, the resin injection port 41, the sprue 39, and the runner 42.

When the resin in the hollow 36 is solidified by being reduced in heat by the coolant in the coolant passages 52 and 53, the retainer 38 is moved in a direction so as to be separated from the resin as shown in FIG. 2 by an unshown driving unit (more correctly, the metal mold is in a 90° rotated state). Further, after the side core 34b is withdrawn from the core body 34a, the TV cabinet 32 is released from the mold. Thereafter, the injection mold 31 is again closed as shown in FIG. 1, followed by a repetition a of the above-described steps from this point on.

As described above, the present embodiment has an arrangement such that even if the system should malfunction when injection molding, causing an abnormal rise in the pressure acting on the inside of the hollow 36, the valve body 48 of the pressure relief valve 40 is actuated by being pressured through resin directly thereon and not by detecting the pressure indirectly for example, through an electrical circuit or an intermediate member, as in conventional cases. Furthermore, the farther it is from the positions of the sprue 39 and the runner 42 located upstream of the resin passage, i.e. the closer it is to the terminal end of the hollow 36, the more the resin pressure drops. Therefore, it is preferable that the pressure relief valve 40 is provided at an upstream position of the resin passage where the resin pressure is high. For this reason, in the present embodiment, any abnormal pressure is promptly detected at this upstream position so that if the resin pressure exceeds a predetermined value, the resin is positively discharged from the runner out of the cavity mold 33. Thus, it is made possible to intercept any pressure rise in the hollow 36 and prevent the injection mold 31 from breakage due to abnormal pressure.

As a result, according to the present embodiment, any abnormal rise in the resin pressure can be positively prevented in this way, whereby it is no longer necessary to estimate the safety factor of the injection molding unit to be a great one in view of abnormal cases, nor, therefore, to allow a high withstanding pressure in designing the unit. For example, the maximum resin pressure at normal injection molding is 400–600 at., the conventionally set withstanding pressure in designing injection molds is 1000–1200 at., and in the case of TV cabinets, the wall thickness of the cavity die is at least 25 cm. In this embodiment, the maximum resin pressure is allowed to be the withstanding pressure for mold design. As a consequence, the wall thickness of the injection mold 31 can be reduced to as little as 16 cm in connection to the above example, allowing the mold to be lightweight and compact, and further to be split construction reasonably. In other words, with a high withstanding pressure on design, if the cavity mold 33 is split construction, there arises the need of a firm reinforcement structure around the cavity mold 33 in order to prevent the cavity mold 33 from being broken up by the action of the high pressure. In connection to this, in this embodiment it becomes easy, by the provision of the pressure relief valve 40, to make the cavity mold 33 of a split construction, as shown in FIG. 3.

As shown above, by arranging the cavity mold 33 to be of the split construction type, the cavity mold 33 can be manufactured separately in units of the segments separately, which allows a substantial reduction in manufacturing time. Also, as compared with a case where the injection mold 31 is required to have a high dimensional accuracy and is formed by carving the inside of a steel ingot, if the cavity mold 33 is split into segments, particularly if the wall of the hollow 36 is split, on its inner periphery, into a plurality of segments as in the present embodiment, the work involved becomes much simpler. Further, by arranging the cavity mold 33 to be of the split construction type, even if the cavity mold 33 is partly damaged, the cavity mold 33 as a whole is not required to be replaced, only the damaged segment, thereby eliminating economic waste.

Figure 9:
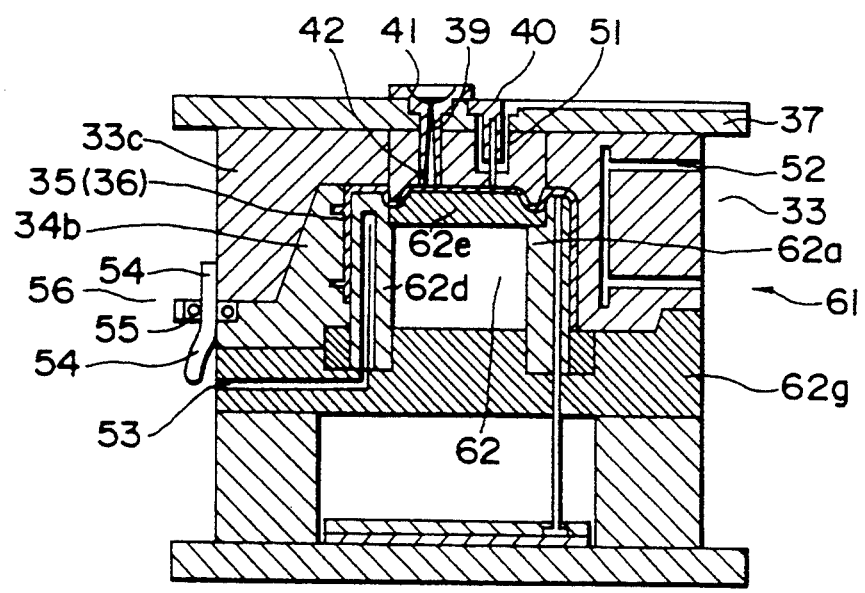
FIG. 9 is a sectional view of an injection mold of an injection molding unit according to a second embodiment of the first and second aspects of the present invention.
Figure 10:
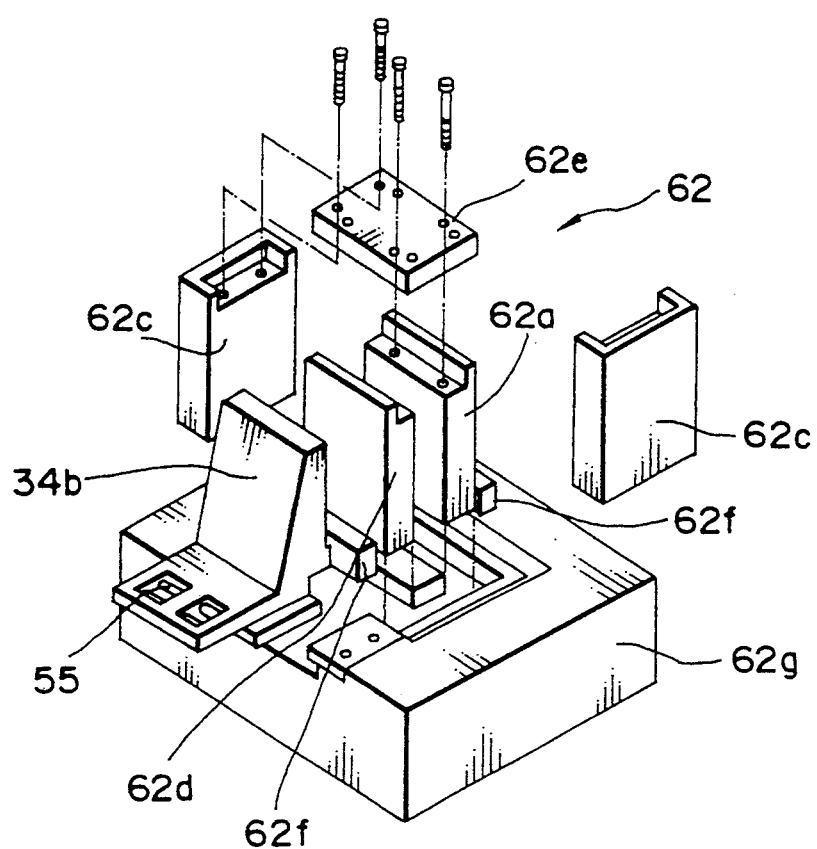
FIG. 10 is an exploded perspective view of a core mold of the injection mold as shown in FIG. 9 and a fitting portion.

FIGS. 9 and 10 show an injection mold 61 of an injection molding unit according to a second embodiment of the first and second aspects of the present invention. This injection mold 61 is substantially identical with the injection mold 31 as shown in FIGS. 1 to 7, except that a core mold 62 is provided instead of the core mold 34. Where corresponding parts are designated by like numerals, their description is omitted.

In this embodiment, the core mold 62 comprises a top plate 62a, a side core 34b, a side wall 62c, a bottom plate 62d, a front panel 62e, an end face 62f, and a core bottom plate 62g assembled by bolting them together.

In this second embodiment, provision of a pressure relief valve 40 allows not only the cavity mold 33, but also the core mold 62, to be split construction, in which case the core mold 62 can have a reduced in manufacturing time, be facilitated in work, be reduced in weight and so on as with the cavity mold 33 in the first embodiment.

The pressure relief means in the present invention is not limited to the pressure relief valve 40 as already described in conjunction with FIGS. 6 and 7, but is only required to be one which allows the resin to be released out of the resin passage when it receives a pressure stronger than a predetermined value. Otherwise, for example, the pressure relief valves 40a and 40b as shown in FIGS. 11 to 14 are included. It is to be noted that parts of FIGS. 11 and 12 substantially identical with those of FIGS. 1 to 10 are designated by like numerals, and their description is omitted.

Figure 11:
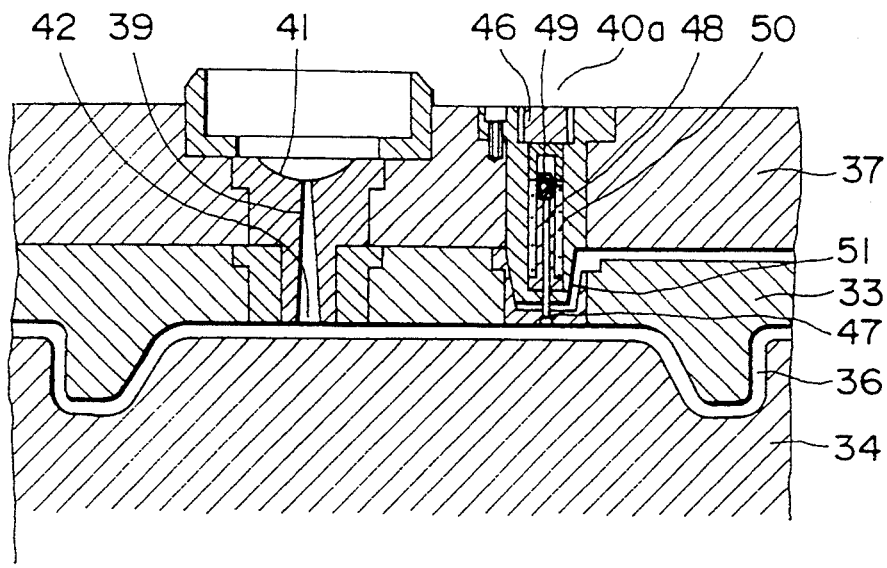
FIG. 11 is a partially sectional view showing a modification of a resin release passage.

The pressure relief valve 40a as shown in FIG. 11 is so arranged that the resin release passage 51 passes between the cavity mold 33 and the retainer 37 to open to a side portion of the cavity mold 33, whereas in the first and second embodiments the resin release passage 51 of the pressure relief valve 40 opens to the top face, as seen in the figure, of the retainer 37.

With such an arrangement, even if the resin pressure increases so much so that the resin flows out of the resin release passage 51, the work of removing the resin can be performed without removing the cavity mold 33 from the holder.

Figure 12:
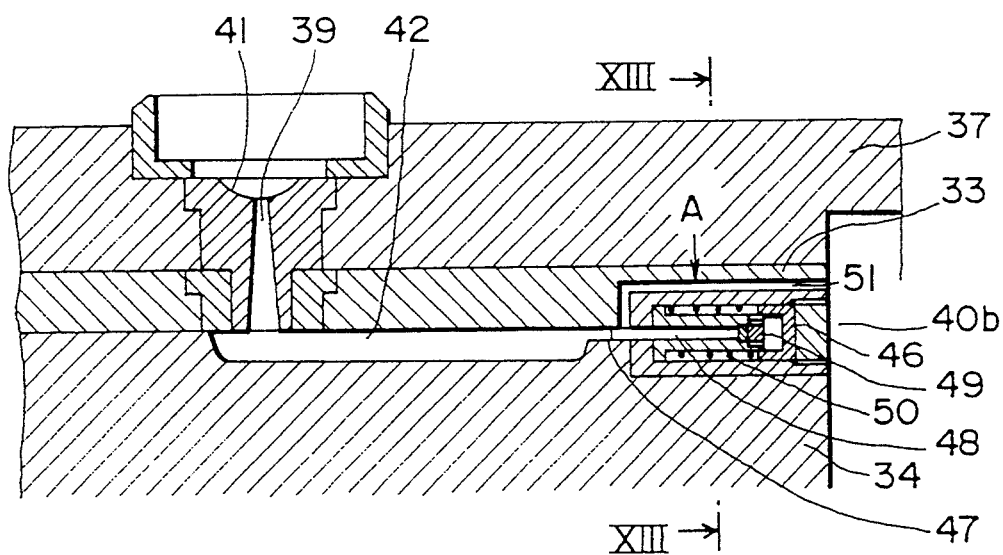
FIG. 12 is a partially sectional view showing a modification of the fitting portion of the pressure relief valve and the resin release passage.
Figure 13:
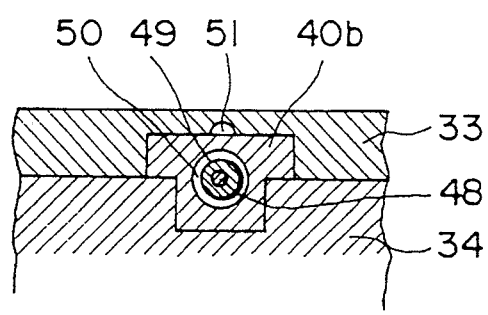
FIG. 13 is a sectional view taken along line XIII—XIII of FIG. 12.
Figure 14:
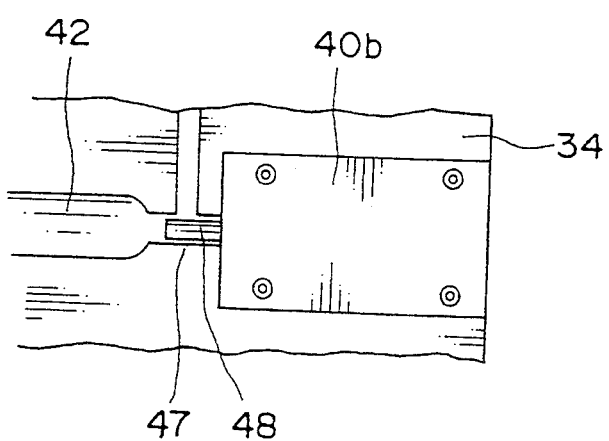
FIG. 14 is a view as seen in direction A of FIG. 12.

The pressure relief valve 40b, as shown in FIGS. 12 to 14, is located at a side portion of the cavity mold 33 to detect the resin pressure in the runner 42, having the resin release passage 51 provided between this side portion and the runner 42 in the lateral direction as seen in the figure, the resin release passage 51 being open to the side portion of the cavity mold 33.

This arrangement allows the work of removing the resin to be carried out without removing the cavity mold 33 from the holder even if the resin has flowed out of the resin release passage 51. Moreover, the arrangement also facilitates the replacement of the pressure relief valve 40b.

Figure 15:
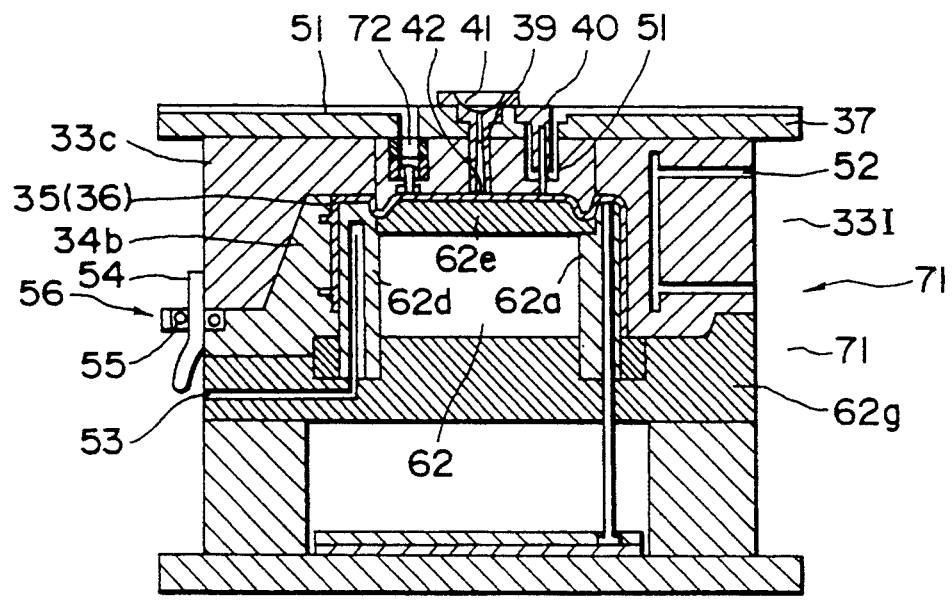
FIG. 15 is a sectional view of an injection mold of an injection molding unit according to a third embodiment of the first and second aspects of the present invention.
Figure 16:
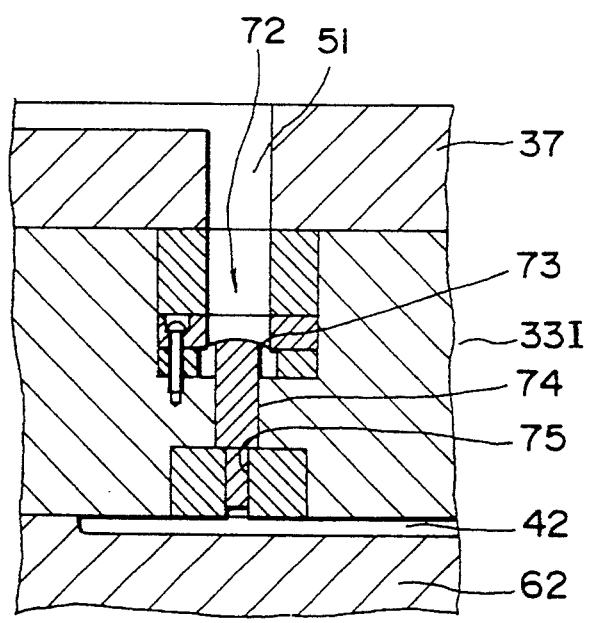
FIG. 16 is an enlarged sectional view of a pressure relief device of the injection mold as shown in FIG. 15 and a fitting portion.

FIGS. 15 and 16 show an injection mold 71 of an injection molding unit according to a third embodiment of the first and second aspects of the present invention. The injection mold 71 is substantially identical with the injection mold 61 as shown in FIGS. 9 and 10, except that a cavity mold 33I is provided instead of the cavity mold 33. Where corresponding parts are designated by like numerals, their description is omitted.

In this embodiment, as the pressure relief means, a pressure relief device 72 is provided in addition to the pressure relief valve 40 to form the cavity mold 33I.

The pressure relief device 72 comprises a diaphragm 73 for closing the runner 42 side end of the resin release passage 51, with a stepped pin 74 intervening between the diaphragm 73 and the runner 42. The stepped pin 74 is fitted into a small stepped hole 75 protrusively provided between the diaphragm 73 and the runner 42, its upper end (as shown in the figure) being urged toward the runner 42 by the diaphragm 73 at all times. The stepped pin 74 is also kept in position by its step portion being engaged with the step portion of the small hole 75, its lower end (as seen in the figure) communicating with the runner 42 to be subject to the resin pressure.

With this arrangement, when the resin pressure exceeds a predetermined value, the diaphragm 73 is broken up by the upward force from the lower end of the stepped pin 74, which receives the resin pressure, whereby the stepped pin 74 is pushed upward. As a result, the runner 42 and the resin release passage 51 communicate with each other so that the resin is discharged to the resin release passage 51 and the resin pressure is prevented from abnormally rising.

Moreover, by providing the pressure relief valve 40 and the pressure relief device 72 as described above, the reliability of preventing any excessive pressure is improved still more than in the first and second embodiments.

Figure 17:
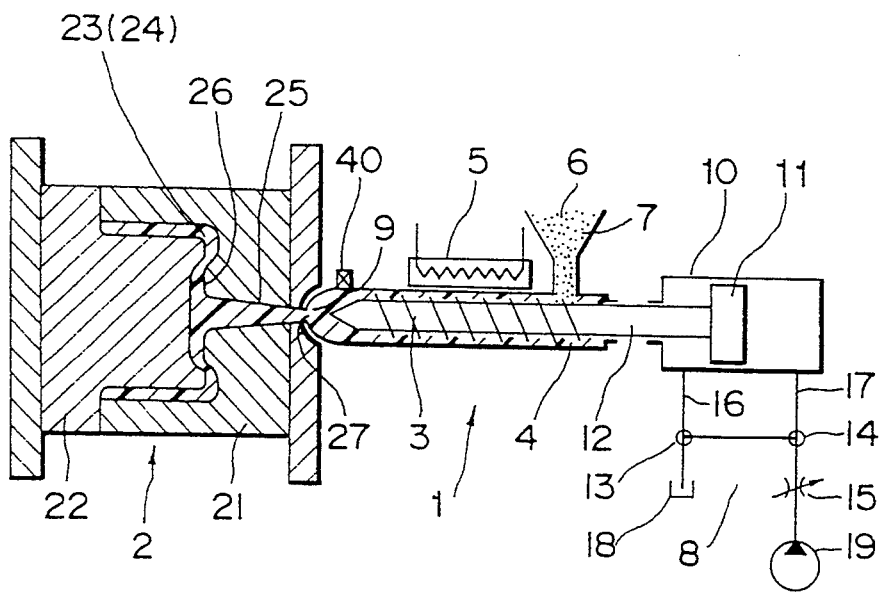
FIG. 17 is a view schematically showing an injection molding unit according to a fourth embodiment of the first and second aspects of the present invention.

FIG. 17 shows an injection molding unit according to a fourth embodiment of the first and second aspects of the present invention. The injection molding unit is substantially identical with that shown in FIG. 19, except that the pressure relief valve 40 is provided at the tip of the screw cylinder 4. Where corresponding parts are designated by like numerals, their description being omitted.

This embodiment is arranged so that abnormal pressure is prevented from occurring at the tip of the screw cylinder 4, thus preventing the occurrence of any abnormal pressure within the hollow 24. By this arrangement, as in the foregoing embodiments, the manufacture of the injection mold can be shortened in time and facilitated in work.

Figure 18:
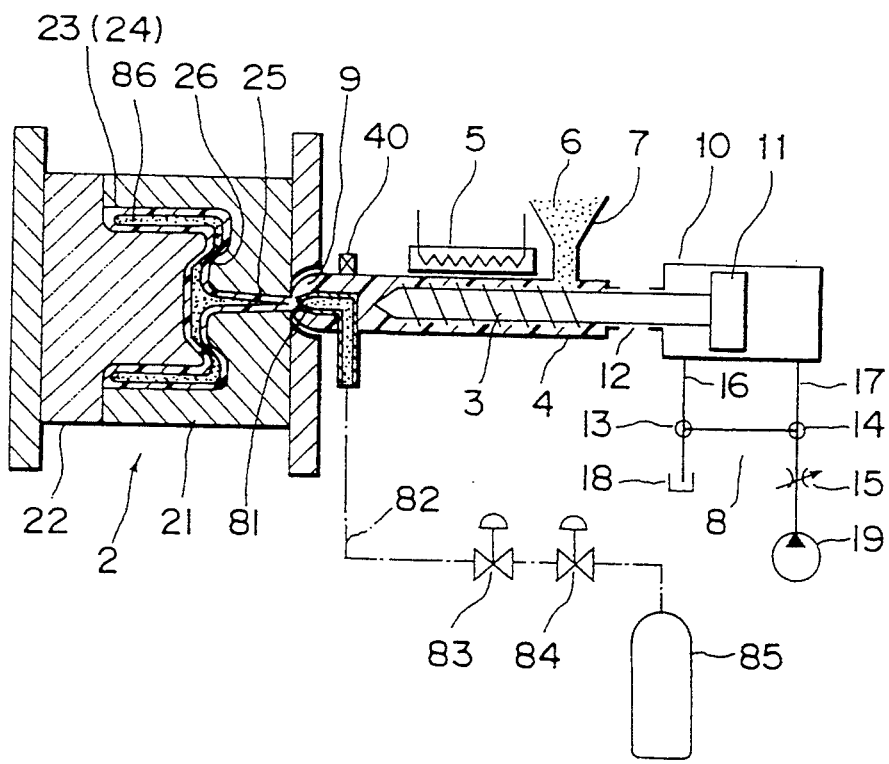
FIG. 18 is a view schematically showing an injection molding unit according to a fifth embodiment of the first and second aspects of the present invention.

FIG. 18 shows an injection molding unit according to a fifth embodiment of the first and second aspects of the present invention. Con, non parts with the injection molding unit as shown in FIG. 17 are designated by like numerals, and their description is omitted.

This embodiment provides an injection molding unit to which the so-called gas assist method is applied, wherein a nozzle 9 at the tip of the screw cylinder 4 is provided by a double tube, a pressure relief valve 40 is provided, which is actuated by detecting the resin pressure at this nozzle portion is provided, and a gas passage 82 having a gas injection nozzle 81 at one end inside the nozzle 9. This gas passage 82 is connected to a high-pressure gas source 85 via a selector valve 83 and a pressure reducing valve 84.

With this arrangement, when the resin is injected from the nozzle 9 into a hollow 24 within an injection mold 21 at the time of injection molding, a high-pressure gas (e.g. 100 at) is injected from the gas injection nozzle 81 before the resin cools and solidifies. As a result, a gas space 86 is formed inside the resin within the hollow 24 so that the resin tends to expand outwardly due to the gas pressure in the gas space 86, and be urged against the wall surface of the hollow 24. This means that the gas within the gas space 86 serves as pressure retention maintaining the unsolidified resin in the hollow 24 pressurized. Pressure retention in the injection molding unit as shown in FIG. 19 is effected in such a way that pressure is applied to the resin at the tip of the nozzle 9 and the resulting resin pressure is transferred to the resin at the terminal end of the hollow 24 via a sprue 25 and a runner 26. Accordingly, a great pressure drop takes place over the range from the tip of the nozzle 9 to the aforementioned terminal end. To produce a pressure retention effect at this terminal end portion, a resin pressure $P_{SC}$ of 800–1400 at. was needed as stated before.

In contrast to this, in the case of the injection molding unit as shown in FIG. 18, since the gas pressure can be caused to act directly from the gas space 86 to the resin at the terminal end of the hollow 24, there will arise almost no pressure drop from the pressurizing source, thus allowing pressure retention to be effected to the resin at the terminal end. Therefore, the gas pressure during pressure retention may be kept low, and the withstanding strength of the injection mold 21 small.

In addition, in the embodiments as shown in FIGS. 17 and 18, a pressure relief valve 40a or 40b may also be provided at the tip of the screw cylinder 4 instead of the pressure relief valve 40. Further, instead of these valves, or in combination with any of these valves, a pressure relief device 72 may be provided.

Further, in the embodiments as shown in FIGS. 17 and 18, the injection mold 21 may also be provided with the pressure relief means 40, 40a, and 40b as shown in the first to third embodiments.

If the split construction type injection mold 31, 61, or 71 as shown in the first to third embodiments is adopted instead of the injection mold 21 as shown in FIGS. 17 and 18, the injection molding unit results in the one according to the first aspect of the invention. In particular, the injection molding unit as shown in FIG. 18, to which the gas assist method is applied, makes low-pressure injection molding available, and moreover offers an improved reliability in preventing the occurrence of abnormal pressures, and facilitates and effectuates the adoption of the split construction type injection mold by virtue of its provision of the pressure relief means.

It is to be noted that in the present invention, the locations of the pressure relief valves 40, 40a, 40b, and the pressure relief device 72 are not limited to those shown in the above embodiments. The invention should be construed as including injection molding units in which the pressure relief means is provided at any point on the resin passage, including the screw cylinder 4 and ranging up to the hollow 24, 36.

As is apparent from the above description, according to the first aspect of the present invention, there is provided an injection molding unit having an injection molding machine for injecting a molten resin plasticized in a screw cylinder from a nozzle fitted at the tip of the screw cylinder by advancing a screw, and an injection mold for forming a hollow for use of an injection molded product by a cavity mold and a core mold, the injection molding unit further comprising pressure relief means for releasing the resin out of a resin passage when a pressure greater than a predetermined value acts at any point on the resin passage, including the screw cylinder, and ranging up to the terminal end of the hollow.

Thus, the pressure relief means directly receives pressure, serving to release the resin out of the passage when the pressure becomes high, allowing an improved reliability in preventing the occurrence of any excessive abnormal resin pressure. The resulting advantages are that the pressure-proof strength of the injection mold may be lowered, the injection mold can be made lightweight by its a reduced wall thickness, a split construction can be adopted without providing any reinforcement structure, and so on.

Also, according to the first aspect of the present invention, the cavity mold is of such a split construction that the wall portion of the hollow is formed from a plurality of segments.

Thus, besides the advantages of the first aspect of the invention, the injection mold can be manufactured separately for each of the plurality of segments, which makes the manufacture of the injection mold simpler and faster. Moreover, if the injection mold is partly damaged, it is sufficient to replace only the damaged part without exchanging the entire injection mold with a new one, advantageously reducing economic loss.

Further, according to the second aspect of the invention, the pressure relief means is provided at a position on the upstream side including the runner portion of the resin passage.

Thus, the pressure relief means directly receives pressure, so that when the pressure becomes high, the resin is released out of the passage. As a result and as a further advantage, any excessive abnormal resin pressure can be more positively prevented from occurring.

What is claimed is:

1. An injection molding unit comprising an injection molding machine for injecting a molten resin plasticized in a screw cylinder from a nozzle fitted at a tip of said screw cylinder by advancing the screw to a molding cavity of an injection mold having a cavity mold and core mold having a hollow therebetween to produce an injection molded part, wherein the injection molding unit further comprises:

pressure relief means for releasing the molten resin out of a resin passage when a pressure measured at any point on said resin passage is greater than a corresponding predetermined value, said resin passage extending between the screw cylinder and a terminal end of the core mold; and the cavity mold being formed by a plurality of mold segments forming wall portions of the hollow.

2. The injection molding unit of claim 1, wherein said resin passage includes a runner in said injection mold and said pressure relief means is located along said resin passage upstream of said runner.

3. An injection molding unit, comprising:

an injection molding machine for injecting plasticized molten resin, said injection molding machine including a screw cylinder having a tip, a nozzle at said tip and a screw advanceable in said screw cylinder for injecting molten resin from said nozzle;

an injection mold comprising a cavity mold and a core mold forming a hollow therebetween for forming an injection molded product therein;

a resin passage extending from inside said screw cylinder to a terminal end of said hollow; and a pressure relief means for releasing molten resin from said resin passage at a pressure of the molten resin in said resin passage greater than a predetermined value;

wherein said cavity mold comprises a plurality of cavity mold segments defining respective wall portions of said hollow.

4. The injection molding unit of claim 3, wherein said resin passage includes a runner in said injection mold and said pressure relief means is located along said resin passage upstream of said runner.

5. The injection molding unit of claim 3, wherein said pressure relief means comprises a hole communicating with said resin passage, a valve having a valve member biased into said hole, and a relief passage communicating with said hole.

6. The injection molding unit of claim 5, wherein said valve has a spring biasing said valve member into said hole.

7. The injection molding unit of claim 5, wherein said valve has a diaphragm biasing said valve member into said hole, said diaphragm being breakable at said pressure greater than the predetermined valve.

8. The injection molding unit of claim 5, wherein said resin passage includes a runner in said injection mold and said hole communicates directly with said runner.

9. The injection molding unit of claim 5, wherein said hole communicates directly with said hollow.

10. The injection molding unit of claim 3, wherein said pressure relief means is located on said screw cylinder.

11. An injection molding unit, comprising:

an injection molding machine for injecting plasticized molten resin, said injection molding machine including a screw cylinder having a tip, a nozzle at said tip and a screw advanceable in said screw cylinder for injecting molten resin from said nozzle;

an injection mold comprising a cavity mold and a core mold forming a hollow therebetween for forming an injection molded product therein;

a resin passage extending from inside said screw cylinder to a terminal end of said hollow; and a pressure relief valve located on said resin passage and adapted to release molten resin from said resin passage at a pressure of the molten resin in said resin passage greater than a predetermined value;

wherein said cavity mold comprises plurality of cavity mold segments defining respective wall portions of said hollow.

12. The injection molding unit of claim 11, wherein said resin passage includes a runner in said injection mold and said pressure relief valve is located along said resin passage upstream of said runner.

13. The injection molding unit of claim 11, wherein said pressure relief valve comprises a hole communicating with said resin passage, a valve member biased into said hole, and a relief passage communicating with said hole.

14. The injection molding unit of claim 13, wherein said valve has a spring biasing said valve member into said hole.

15. The injection molding unit of claim 13, wherein said valve has a diaphragm biasing said valve member into said hole, said diaphragm being breakable at said pressure greater than the predetermined valve.

16. The injection molding unit of claim 13, wherein said resin passage includes a runner in said injection mold and said hole communicates directly with said runner.

17. The injection molding unit of claim 13, wherein said hole communicates directly with said hollow.

18. The injection molding unit of claim 11, wherein said pressure relief valve is located on said screw cylinder.

* * * * *